(12) United States Patent
Chitsaz et al.

(10) Patent No.: US 9,590,477 B2
(45) Date of Patent: Mar. 7, 2017

(54) ROTATING RECTIFIER ASSEMBLY FOR ELECTRIC MACHINE

(71) Applicant: GE Aviation Systems LLC, Grand Rapids, MI (US)

(72) Inventors: Bijan Chitsaz, Springboro, OH (US); James R. Fox, Huber Heights, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 433 days.

(21) Appl. No.: 14/249,582

(22) Filed: Apr. 10, 2014

(65) Prior Publication Data

US 2015/0295479 A1 Oct. 15, 2015

(51) Int. Cl.
*H02K 11/04* (2016.01)
*H02K 19/38* (2006.01)

(52) U.S. Cl.
CPC ......... *H02K 11/046* (2013.01); *H02K 11/042* (2013.01); *H02K 19/38* (2013.01)

(58) Field of Classification Search
CPC ..... H02K 11/042; H02K 11/046; H02K 19/38
USPC .................................................. 310/68 D, 71
See application file for complete search history.

(56) References Cited

U.S. PATENT DOCUMENTS

| | | | |
|---|---|---|---|
| 2,897,383 A * | 7/1959 | Braun | H02K 11/042 310/68 D |
| 3,348,127 A | 10/1967 | Petersen | |
| 4,628,219 A * | 12/1986 | Troscinski | H01L 25/074 257/658 |
| 4,745,315 A | 5/1988 | Terry, Jr. et al. | |
| 4,806,814 A * | 2/1989 | Nold | H02K 11/042 310/168 |
| 5,001,376 A | 3/1991 | Iseman | |
| 5,414,318 A | 5/1995 | Shimizu et al. | |
| 6,903,470 B2 | 6/2005 | Doherty et al. | |
| 7,166,943 B2 * | 1/2007 | Johnsen | H01L 24/72 257/E23.078 |
| 7,944,100 B2 | 5/2011 | Lemmers, Jr. et al. | |
| 2003/0164651 A1 | 9/2003 | Tornquist et al. | |
| 2006/0176720 A1 | 8/2006 | Lemmers, Jr. et al. | |
| 2010/0019628 A1 | 1/2010 | Kitzmiller et al. | |
| 2010/0283357 A1* | 11/2010 | Lemmers, Jr. | H02K 11/042 310/68 D |

(Continued)

FOREIGN PATENT DOCUMENTS

| | | | |
|---|---|---|---|
| EP | 0168491 B1 * | 8/1989 | ............ H01L 25/112 |
| EP | 1788693 B1 | 9/2009 | |

(Continued)

OTHER PUBLICATIONS

European Search Report and Opinion issued in connection with corresponding EP Application No. 15163056.3 on Feb. 16, 2016.

(Continued)

*Primary Examiner* — Alex W Mok
(74) *Attorney, Agent, or Firm* — GE Global Patent Operation; William S. Munnerlyn (57) ABSTRACT

An electric machine having a rectifier assembly placed within a rotating shaft of the electric machine to convert the AC output of the electric machine to the DC input prior to transmission of the electricity from the electric machine.

14 Claims, 6 Drawing Sheets

(56) References Cited

U.S. PATENT DOCUMENTS

2011/0296672 A1* 12/2011 Ganong .................... F16C 3/02
                                                                      29/598

FOREIGN PATENT DOCUMENTS

| | | | | |
|---|---|---|---|---|
| GB | 1183291 A | | 2/1968 | |
| GB | 1207308 A | * | 9/1970 | ............... H02K 1/24 |
| GB | 1507755 A | | 4/1978 | |
| GB | 2015252 A | | 9/1979 | |
| JP | 2005320086 A | | 11/2005 | |
| JP | 2006320086 A | * | 11/2006 | |
| WO | WO 9013144 A1 | * | 11/1990 | ............ H01L 25/112 |
| WO | 9809366 A1 | | 3/1998 | |

OTHER PUBLICATIONS

A GB Combined Search and Examination Report issued in connection with corresponding Application No. GB1403209.8 on Augus.
Written Opinion for PCT/US2013/043814 dated Mar. 4, 2014.

* cited by examiner

ROTATING RECTIFIER ASSEMBLY FOR ELECTRIC MACHINE

BACKGROUND OF THE INVENTION

Electric machines, such as electric motors and/or electric generators, may be used in the generation of electricity. In the aircraft industry, it is common to find combination motors/generators, where the motor is used to power the generator, and, depending on the configuration, functions as a generator, too. Regardless of the configuration, generators typically include a generator rotor having main windings that are driven to rotate by a source of rotation, such as an electrical or mechanical machine, which for some aircraft may be a gas turbine engine. In some applications, the generators initially generate alternating current (AC), which is rectified to generate direct current (DC) for DC components on the aircraft.

BRIEF DESCRIPTION OF THE INVENTION

In one aspect, a rectifier assembly for placement within a rotating shaft of an electric machine assembly having a first machine providing an alternating current output and a second machine receiving a direct current input, the rectifier assembly includes a rectifying subassembly having a bus bar electrically coupling with at least one of the direct current input of the second machine or the alternating current output of the first machine, and wherein the rectifier subassembly is configured to convert the alternating current output to the direct current input, and a non-conductive sleeve having an outer surface and an inner surface defining an interior having a keyway, and configured to axially receive the rectifying subassembly. The bus bar defines a key, which, when radially aligned with the keyway, provides for the keyed axial insertion of the rectifier subassembly within the sleeve, such that the rectifying subassembly is radially indexed within the sleeve to properly align the rectifying subassembly and the sleeve.

In another aspect, an electric machine assembly includes a thermally conductive rotating shaft defining a shaft interior, a machine at least partially heat coupled with the rotating shaft, and a rectifier assembly comprising an electrically non-conductive sleeve received within the shaft interior and defining a sleeve interior, and a rectifying subassembly received within the sleeve interior and converting alternative current to direct current. At least an overlapping portion of the shaft interior and the sleeve are shaped to define a thermally insulating gap between the shaft and the sleeve, such that the gap prevents a melting of the portion of the sleeve when a heat is applied to the rotatable shaft.

DESCRIPTION OF EMBODIMENTS OF THE INVENTION

Embodiments of the invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, while this description is primarily directed toward an aircraft environment, embodiments of the invention are applicable in any environment using an electric machine.

Figure 1:
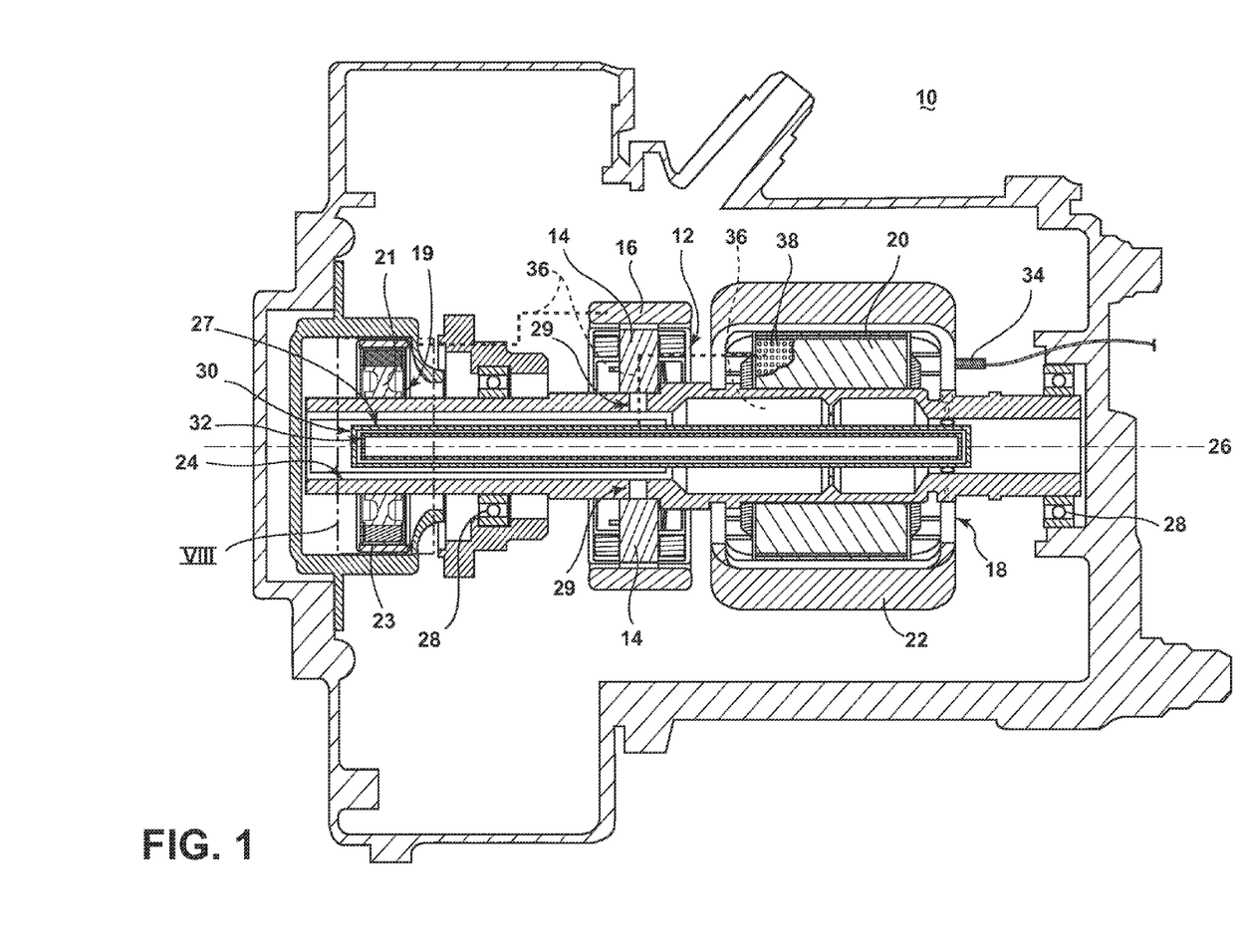
FIG. 1 is a cross-sectional view of an electrical machine assembly.

Turning to an exemplary embodiment of the invention, FIG. 1 schematically illustrates an electrical machine assembly 10 comprising a first machine 12 having an exciter rotor 14 and an exciter stator 16, and a second machine 18 having a main machine rotor 20 and a main machine stator 22. The electrical machine assembly 10 is further shown comprising a permanent magnet generator (PMG) 19 having a PMG rotor 21 and a PMG stator 23. At least one power connection is provided on the exterior of the electrical machine assembly 10 to provide for the transfer of electrical power to and from the electrical machine assembly 10. Power is transmitted by this power connection, shown as an electrical power cable 34, to the electrical load and may provide for a three phase with a ground reference output from the electrical machine assembly 10.

The electrical machine assembly 10 further comprises a thermally conductive rotatable shaft 24 mechanically coupled to a source of axial rotation, which may be a gas turbine engine (not shown), about a common axis 26. The rotatable shaft 24 is supported by spaced bearings 28 and includes access openings 29 radially spaced about the shaft 24. The exciter rotor 14, main machine rotor 20, and PMG rotor 21 are mounted to the rotatable shaft 24 for rotation relative to the stators 16, 22, 23 which are rotationally fixed within the electrical machine assembly 10. The stators 16, 22, 23 may be mounted to any suitable part of a housing portion of the electrical machine assembly 10.

The rotatable shaft 24 further comprises at least a hollow portion for enclosing a rectifier assembly 27, further comprising a sleeve or shaft tube 30, which is contemplated to be non-conducting and further houses a rectifier subassembly 32. The shaft tube 30 is rotationally coupled for co-rotating with the rotatable shaft 24 and the rectifier subassembly 32, and electrically insulates the rectifier subassembly 32 from the rotatable shaft 24. It is envisioned that the shaft tube 30 may comprise any suitable non-conductive material The exciter rotor 14 is electrically connected to the rectifier subassembly 32 by way of conductors 36 (schematically shown as dotted lines). Additionally, the rectifier subassembly 32 is electrically connected to the main windings 38 of the main machine rotor 20 by way of conductors 36. The PMG stator 23 may also be electrically connected to the exciter stator 16 by way of conductors 36.

Figure 2:
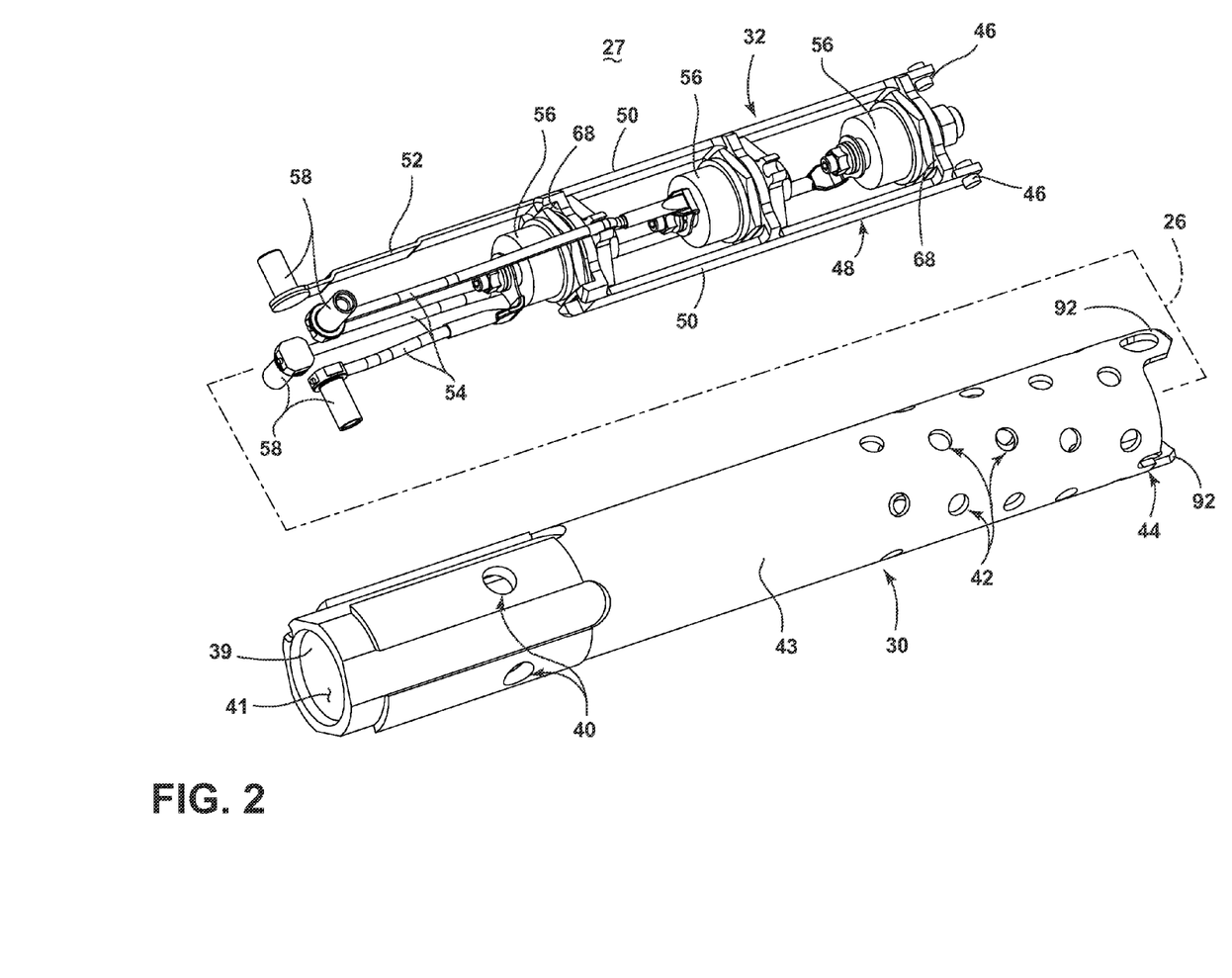
FIG. 2 is a perspective view of the rectifier subassembly and the shaft tube.

Turning now to FIG. 2, the details of the shaft tube 30 and the rectifier subassembly 32 will be described. The shaft tube 30 has a substantially cylindrical structure having an inner surface 39 defining an interior 41, an outer surface 43, opposing open ends, and may further include four mounting connector openings 40 spaced radially near an end of the shaft tube 30. The shaft tube 30 is also shown having optional access openings 42, some of which may be radially aligned for accessing portions of the rectifier subassembly 32. The shaft tube 30 is shown further comprising optional keyed recesses, or anchor fastener openings 44, and extension tabs 92, at the axial end of the shaft tube 30, opposite of the mounting connector openings 40. The extension tabs 92 may provide proper axial spacing of the shaft tube 30 and/or rectifier assembly 27 within the rotatable shaft 24 and/or the electrical machine assembly 10, such that the shaft tube 30 cannot be axially over-inserted into the rotatable shaft 24. In one example, the extension tabs 92 may be radially keyed or indexed with the rotatable shaft 24 such that the shaft tube 30 may only be fully inserted when properly aligned with the rotatable shaft 24.

The rectifier subassembly 32 comprises an axially extending conductive frame, shown as a ladder structure 48, having at least two elongated side elements 50 electrically coupled to each other via at least one conductive diode seat 68. The rectifier subassembly 32 also includes a plurality of conductive bus bars 52, 54 shown radially spaced about the rectifier subassembly 32 axis, illustrated as a single resilient conductive DC bus bar 52 and three conductive, yet malleable, output AC bus bars 54. As used herein, the term "resilient," in describing the DC bus bar 52, denotes at least a portion of the bus bar 52 configured to bias the bus bar 52 outwardly to the straight position shown. Stated another way, the DC bus bar 52, when flexed, will bias back towards the non-flexed position shown. Similarly, the term "malleable" is used to describe the output AC bus bars 54 such that they may be easily altered, bent, or moveable as needed, and may be comprised from non-resilient wiring, or other suitable conductive material.

The ladder structure 48 further comprises a set of axially spaced, forward-biased diodes 56 electrically coupling at least one of the AC bus bars 54 to the ladder structure 48. The ladder structure 48 is further electrically coupled to the DC bus bar 52. The ladder structure 48 may be made of any suitable conductive material, for example, aluminum.

Each bus bar 52, 54 comprises a first end having terminal connectors 58 for securing the respective DC and AC bus bars 54, 52 to the respective first and second machines 12, 18 by way of conductors 36. The AC bus bars 54 receive the input AC voltage from the first machine and the DC bus bars 52 deliver the output DC voltage from the rectifier subassembly 32. As illustrated, the terminal connectors 58 may be integrally formed and/or conjoined with the first end of the bus bars 54, 52. Alternatively, a fastener, such as a screw may be provided to aid in the mounting of the terminal connectors 58 to the first end of the bus bars 54, 52. Alternatively, non-mechanical fasteners, such as welding or adhesive may also be used. Additionally, while the AC bus bars 54 are described as flexible, it is envisioned that the DC and AC bus bars 52, 54 may comprise any combination of flexible and/or inflexible conductive materials.

The assembled components 48, 52, 54, 56 collectively define an axially extending, annular rectifier structure defining an axially extending interior. Alternate placement and configuration of the components 48, 52, 54, 56 are envisioned.

The ladder structure 48 may also optionally comprise assembly anchors, shown as protrusions 46, which may be keyed to interact with the corresponding anchor fastener openings 44 of the shaft tube 30. The protrusions 46 and anchor fastener openings 44 are configured such that when the rectifier subassembly 32 is inserted within the shaft tube 30, the protrusions 46 are radial keyed to be axially received within the fastener openings 44. Additionally, the terminal connectors 58 and mounting connector openings 40 are configured such that, when the shaft tube 30 and the rectifier subassembly 32 are assembled and keyed based on the corresponding protrusions 46 and fastener openings 44, the connectors 58 are received by the openings 40 to provide for electrical coupling between the AC connectors 58 and the first machine 12, and the DC connectors 58 and the second machine 18.

Figure 3:
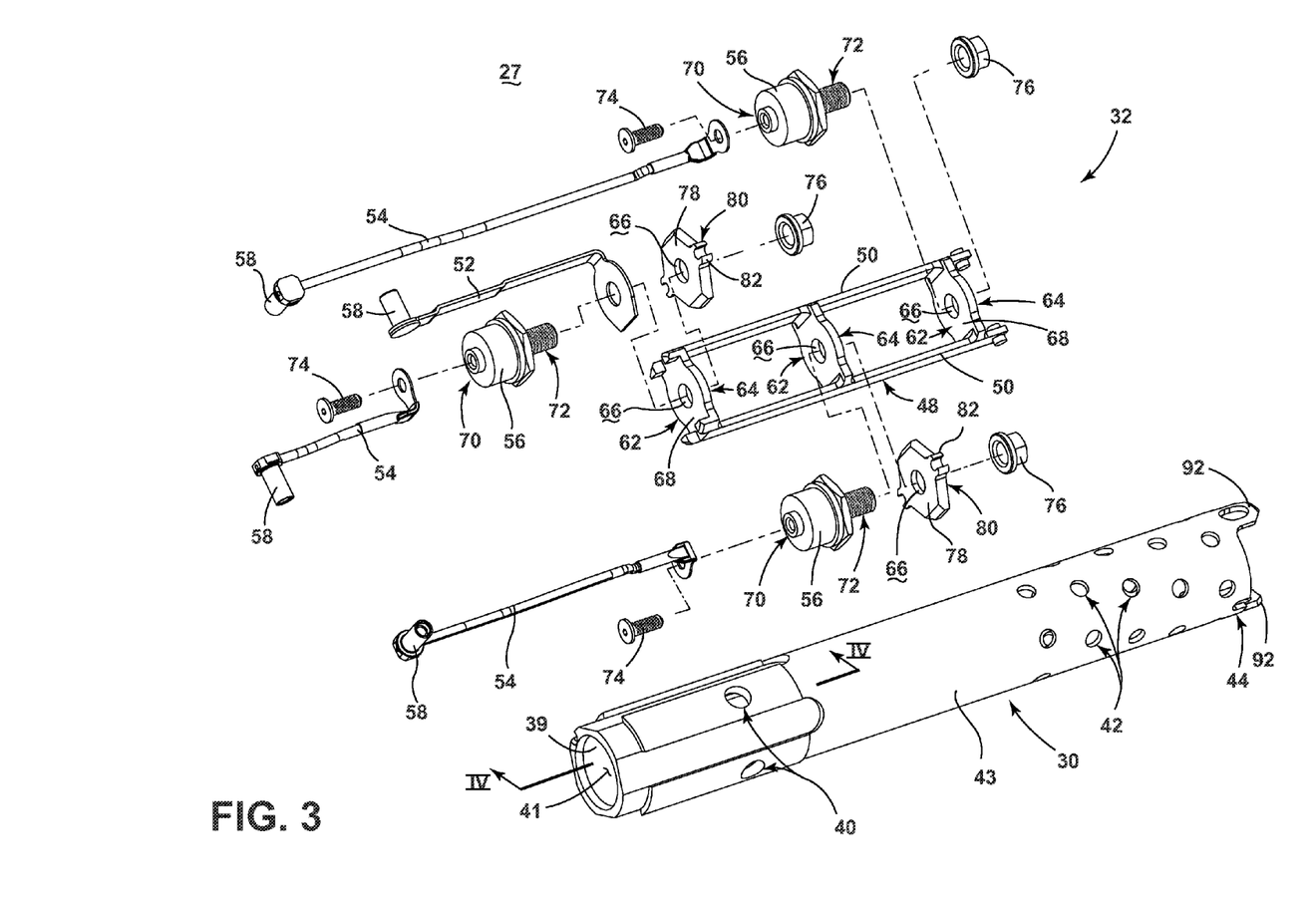
FIG. 3 is an axially exploded view of the rectifier subassembly and the shaft tube.

FIG. 3 illustrates an exploded perspective view of the rectifier subassembly. As illustrated, the ladder structure 48 further comprises axially spaced and axially facing conductive diode seats 68 electrically coupling the side elements 50, wherein each seat 68 further comprises axially opposing first and second segment faces 62, 64, and an opening 66 that may extend through the seat 68. In one example, the first segment face 62 of each seat 68 may operate and or be configured for receiving the diode 56.

Each diode 56 may additionally comprise an anode terminal 70 and a cathode terminal 72, configured in the direction of the diode 56 bias, wherein each terminal 70, 72 may be configurably coupled with any conductive surface coupling or suitable conductive mechanical or non-mechanical fasteners. In the illustrated example, the diodes 56 are shown having an anode terminal 70 configured to receive a mechanical fastener, such as a threaded screw 74, and a cathode terminal 70 configured to include a threaded screw 74 receivable by a screw base 76.

The rectifier subassembly 32 may additionally comprise at least one non-conductive isolating segment 78 having at least one radially spaced guide channel, such as mounting connector 80, and configured to be placed adjacent to a second segment face 64 of a diode seat 68. In this sense, the isolating segment 78 may be supported by the diode seat 68, opposite of the diode 56. The mounting connector 80 may further be defined by restraining elements, shown as semi-circular restraining arms 82, configured such that the AC bus bars 54 extending axially along the isolating segment 78 may be receivably mounted by the mounting connector 80. It is envisioned that the mounting connectors 80 may provide a suitable mounting coupling with the AC bus bars 54 wherein the mounting prevents damage to the bus bars 54, for instance, from vibrations or slight movements of the bus bars 54 relative to the mounting connector 80. In the example shown, the isolating segment 78 may further include an opening 66, similar in size, shape, and placement, to the opening of a correspondingly adjacent diode seat 68.

When the rectifier subassembly 32 is assembled, each AC bus bar 54 may be electrically coupled with an anode terminal 70 of a diode 56 by, for example a threaded screw 74. The diode 56 is further electrically coupled, via the cathode terminal 72, to a first segment face 62 of a diode seat 68. In the example illustrated, the threaded extension of the cathode terminal 72 may be received through the opening 66 of the diode seat 68, and further received through the opening 66 of the isolating segment 78, wherein the threaded extension of the cathode terminal 72 may be, for instance, compressively fixed by a screw base 76. As shown, the assembling of the AC bus bar 54 and diode 56 closest to the bus bar 52, 54 end of the ladder structure 48 may also include an electrical coupling of the cathode terminal 72 of the diode 56 to the DC bus bar 52 in addition to the electrical coupling of the terminal 72 to the ladder structure 48, for instance, by receiving the threaded extension of the terminal 72 through a corresponding opening 66 of the DC bus bar 52. In this instance, the ladder structure 48 and/or diode seat 68 may be keyed to mount the DC bus bar 52 in a certain configuration. Alternatively, the DC bus bar 52 may be electrically coupled to the ladder structure 48 at another mounting point. Alternative fixing methods and/or devices for assembling the above mentioned components are envisioned.

Additionally, when the rectifier subassembly 32 is assembled, the AC bus bars 54 extends axially along the rectifier subassembly 32 such that the diodes 56 may be electrically isolated from the ladder structure 48 and/or other diodes 56 by the mounting connectors 80 of the isolating segments 78. While substantially circular diodes 56, diode seats 68, and isolating segments 78 are illustrated, alternative shapes are envisioned. For example, circular or alternative shapes may include grooves or additional openings to allow for coolant and/or oil to transverse through the interior of, or about, the rectifier subassembly 32.

Additionally, as shown, the three AC bus bars 54 receive the respective three-phase AC output of the exciter rotor 14. Furthermore, the DC bus bar 52 is used for the transmission of the DC output to the second machine 18. Alternate arrangements and quantities of AC and DC bus bars 54, 52 are envisioned based on the needs and configuration of the electrical machine assembly 10.

Figure 4:
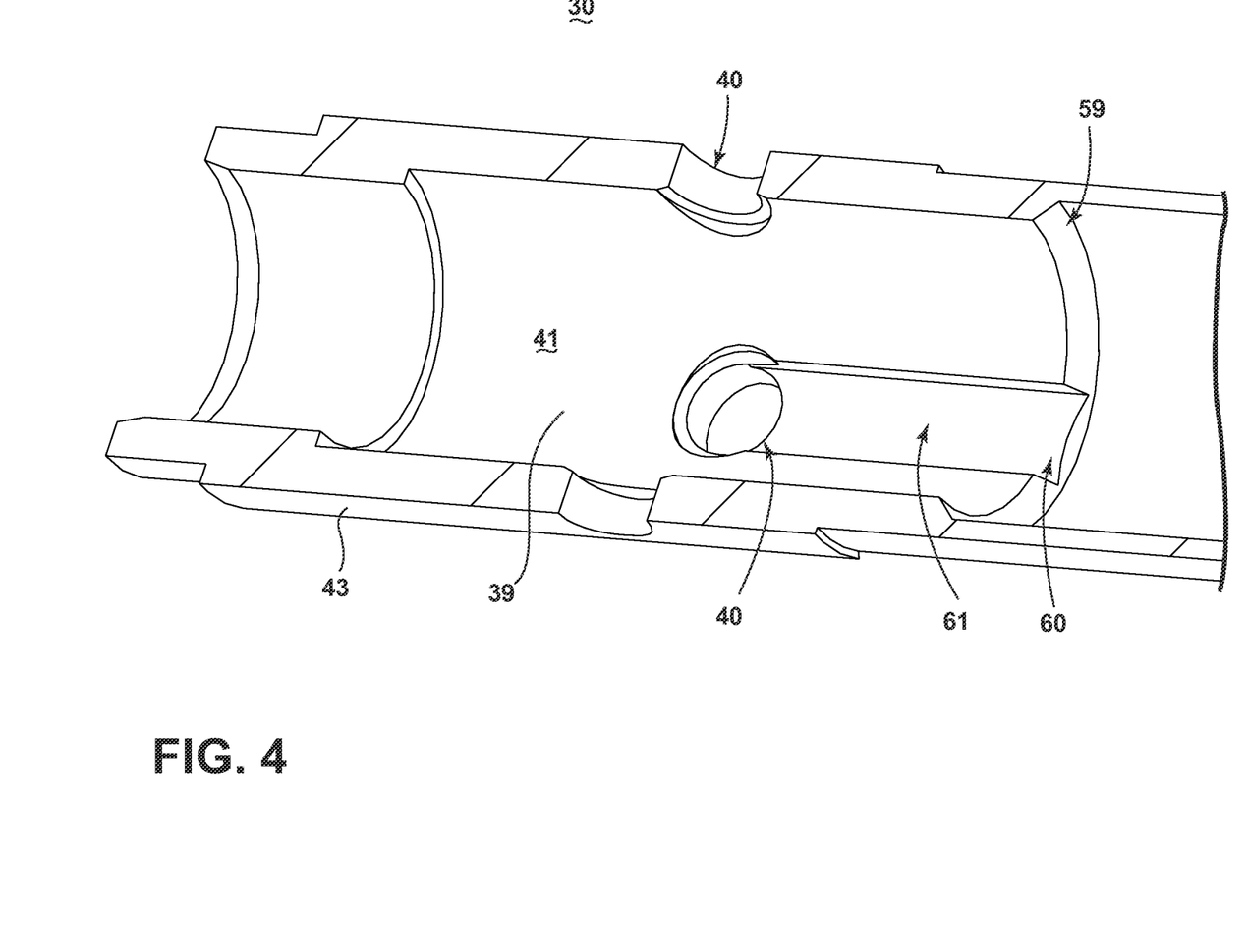
FIG. 4 is a perspective view taken along line 4-4 of FIG. 3, showing the channel on the inner surface of the shaft tube.

FIG. 4 illustrates a perspective view of the shaft tube 30, taken along line 4-4 of FIG. 3. As seen, the inner surface 39 and/or the interior 41 of the shaft tube 30 may further comprise at least a first portion of a radial segment defining a stop 59 extending from the inner surface 39, and at least another portion of the radial segment, different from the first, defining a keyway 60 without the stop 59. As shown, the keyway 60 further comprises an open top channel 61 extending axially along the inner surface 39 of the shaft tube 30 to the mounting connector opening 40. The stop 59 and keyway 60 are configured such that the stop 59 may prevent the axial insertion of components interacting with stop 59, but the keyway 60 will allow axial insertion of components that are radially aligned with, or radially indexed with the keyway 60. While the stop 59 is illustrated as a angled ridge on the inner surface 39 of the shaft tube 30, alternative geometric stop 59 configurations may be included, for example, an right angle ridge.

Figure 5:
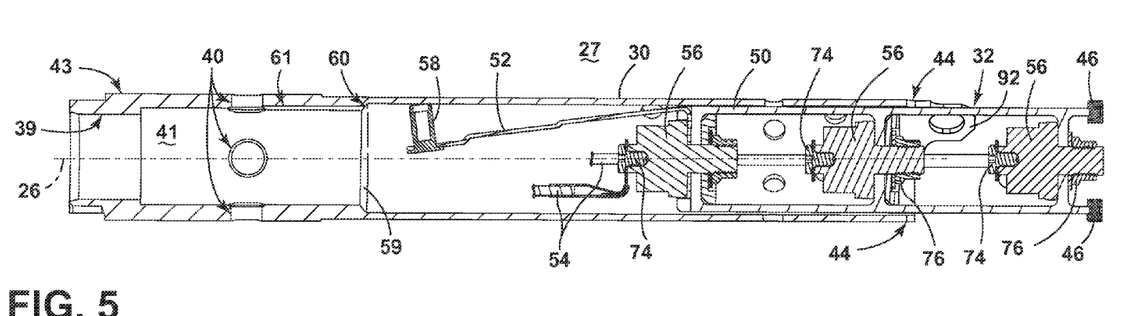
FIG. 5 is a cross-sectional view of the rectifier subassembly partially axially inserted into the shaft tube.

As seen in FIG. 5, the tube shaft 30 is configured to axially receive the rectifier subassembly 32. The resilient DC bus bar 52 may be flexed inwardly such that the bus bar 52 may be received within the interior 41 of the shaft tube 30 as the rectifier subassembly 32 is axially received by the tube 30. In this sense, the resiliency of the DC bus bar 52 biases the bus bar 52 outwardly along the inner surface 39 of the shaft tube 30.

As the rectifier subassembly 32 is axially inserted into the shaft tube 30, at least a portion of the DC bus bar 52 may at least partially intersect the radial segment having the stop 59. In a configuration wherein the DC bus bar 52 is not radially aligned with the keyway 60 and the channel 61, physical interference between the bus bar 52 and/or the terminal connector 58 may prevent the improperly aligned subassembly 32 from being fully inserted into the shaft tube 30. However, DC bus bar 52, which, when radially aligned with the keyway 60 and the channel 61, provides for the axial insertion of the rectifier subassembly 32 within the shaft tube 30. In this sense, the DC bus bar 52 may define a key such that the rectifying subassembly 32 is radially indexed, or keyed, within the shaft tube 30, to properly align the subassembly 32 and the tube 30. Due to the malleability of the AC bus bars 54, the AC bus bars 54 may not provide sufficient interference with the stop 59 during proper or improper alignment of the subassembly 32 and shaft tube 30, to prevent axial insertion of the of the subassembly 32 into shaft tube 30

Figure 6:
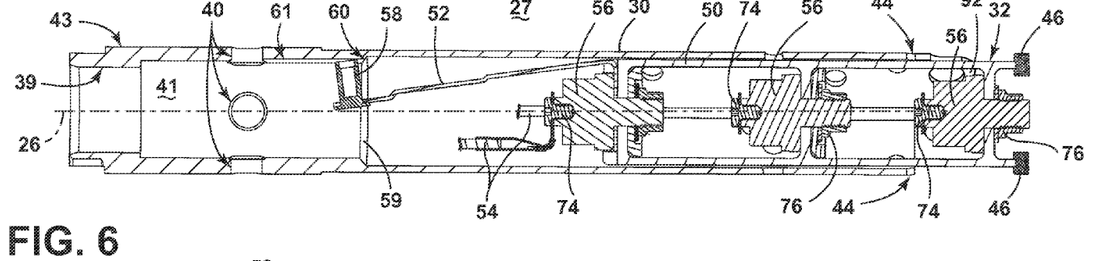
FIG. 6 is a cross-sectional view of the rectifier subassembly further inserted into the shaft tube, wherein the terminal connector is within the channel of the shaft tube.

As seen in FIG. 6, a properly keyed DC bus bar 52 and keyway 60 provide for the axial insertion of the rectifier sub assembly 32 past the stop 59, and the at least a resilient portion of the bus bar 52 continues to bias the bus bar 52 outwardly into the channel 61. In this sense, the sidewalls of the open top channel 61 will prevent the subassembly 32 from axial rotation independent of the shaft tube 30, and thus, keep the subassembly 32 and shaft tube 30 properly aligned and/or keyed through the remainder of the axial insertion.

Figure 7:
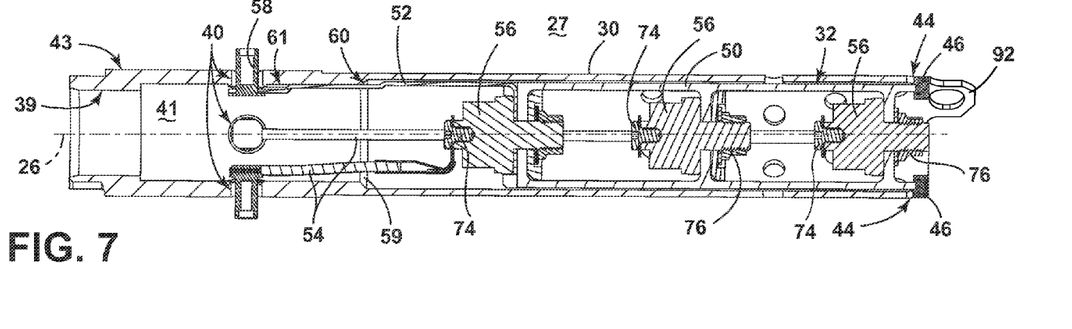
FIG. 7 is a cross-sectional view of the assembled rectifier subassembly and the shaft tube.

FIG. 7 illustrates a cross-sectional view of the assembled rectifier assembly 27 wherein the rectifier subassembly 32 has been fully received within the shaft tube 30. In this configuration, the protrusions are received into the anchor fastener openings 44 to prevent over-insertion of the subassembly 32 into the shaft tube 30. Additionally, the resiliency of the DC bus bar 52 will bias the terminal connector through the radially-aligned mounting connector opening 40 when the subassembly 32 has been fully inserted within the shaft tube 30, further preventing over insertion. Also shown, the fully inserted rectifier subassembly 32 will also provide the AC bus bars 54 the proper level of insertion depth to, for example, manually biased the terminal connectors 58 of the AC bus bars 54 though their corresponding mounting connector openings 40. The rectifier subassembly 32 may be further axially secured to the shaft tube 30 when the terminal connectors 58 are secured to the first and second machines 12, 18, through the mounting connector openings 40.

When fully assembled, that the rectifier subassembly 32 may be rotationally balanced, and thus allows for high speed rotation about the common axis 26.

Figure 8:
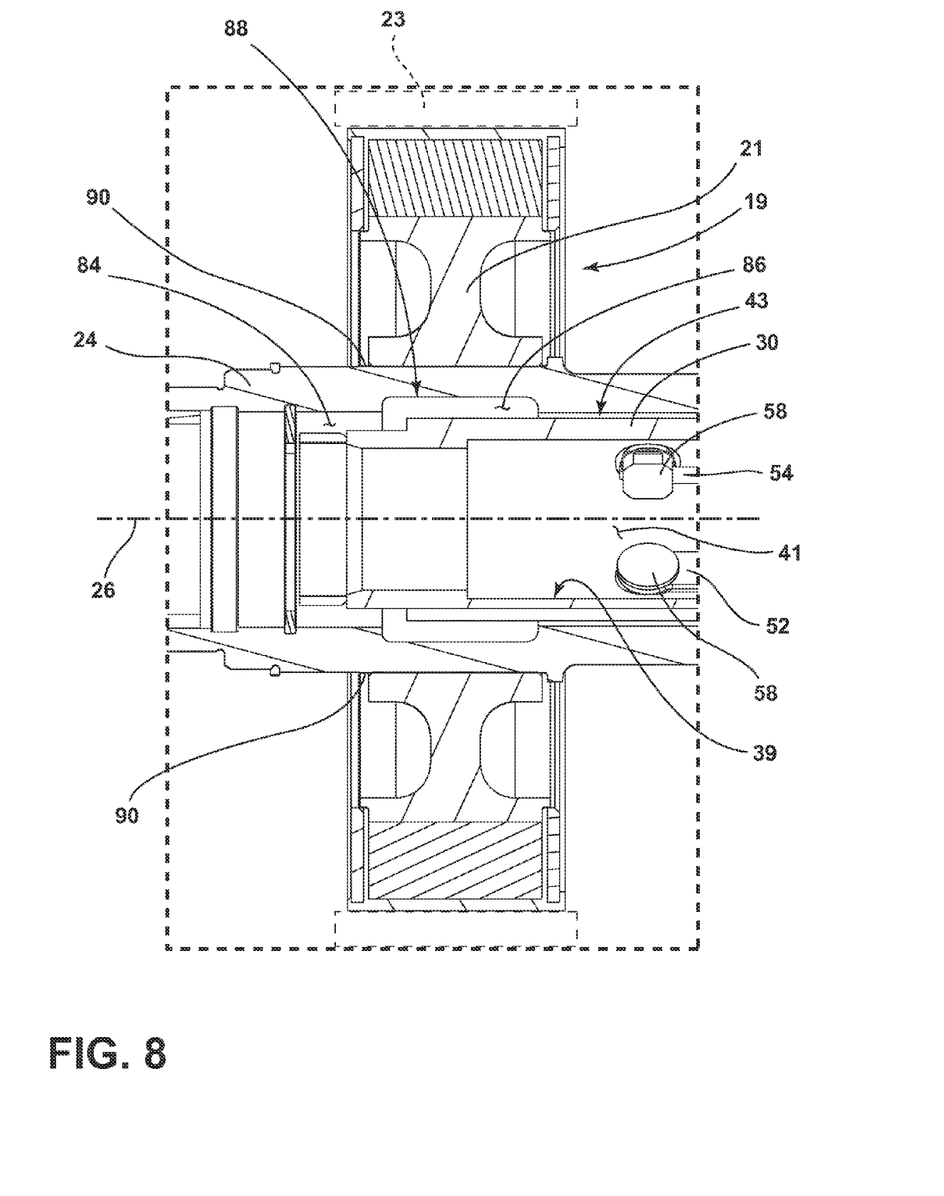
FIG. 8 is an enlarged portion of the area labeled VIII of the electrical machine assembly of FIG. 1, illustrating the rotatable shaft and shaft tube interface at the PMG rotor.

FIG. 8 is an enlarged portion of the area labeled VIII of the electrical machine assembly of FIG. 1, illustrating the rotatable shaft 24 and shaft tube 30 interface at the PMG rotor 21. As shown, the thermally conductive rotatable shaft 24 may define a rotating shaft interior 84, wherein at least a portion of the shaft tube 30 and rotating shaft interior 84 are in an overlapping relationship. The respective overlapping portions of the rotating shaft 24 and shaft tube 30 are shaped to define a thermally insulating gap 86 between the shaft 24 and the tube 30. The insulating gap 86 separates the thermally conductive rotatable shaft 24 from the shaft tube 30, which may be meltable when exposed to heat. In the embodiment illustrated, the insulating gap 86 is an air gap, however alternative embodiments may include additional thermally insulating materials, such as a heat retardant foam, etc. In this sense, the shaft tube 30 may be exposed to convection heat from the rotatable shaft 24, but will not be subjected to amounts of thermal conduction sufficient to melt the tube 30 when heat is applied to the rotatable shaft 24.

The rotating shaft 24 and/or the shaft tube 30 may be configured to define and control the thermal insulation properties of the insulating gap 86. For example, the diameter of the shaft tube 30, in at least an axially extending portion of the overlapping relationship may be increased or decreased to provide for, respectively more or less thermal insulation, relative to the diameter of the same portion of the rotatable shaft 24. As shown, the insulating gap 86 may be further defined by a recess 88 in the rotating shaft 24, however the insulating gap 86 may likewise be further defined by a recess in the shaft tube 30.

Additionally, the PMG rotor 21 is shown in direct heat contact, or heat coupled with the rotating shaft 24, and mounted such that the rotor 21 and shaft 24 will be rotationally coupled. As shown, the PMG rotor 21 may also be axially positioned on the rotating shaft 24 to be at least axially aligned with at least a portion of the overlapping relationship between the rotating shaft 24 and shaft tube 30. In this sense, the PMG rotor 21 overlies at least a portion of the insulating gap 86. In one example, the PMG rotor 21 may be mounted to the rotatable shaft 24 by one or more thermal welding points 90. While welding points are described, embodiments may include welding paths, patches, or lines along the partial or full radial segment of the PMG rotor 21 and shaft 24 interface. In embodiments of the invention wherein the PMG rotor 21 is welded to rotatable shaft 24, the insulating gap 86 may be further configured and/or sized relative to the expected amount of heat generated by the welding points 90, which may be thermally conducted through the rotor 21 and/or the rotatable shaft 24, to prevent melting of the shaft tube 30.

During generator operation, the rotatable shaft 24 is driven by the source of axial rotation. The rotation of the mounted PMG rotor 21 relative to the PMG stator 23 generates a current, which may be supplied to the exciter stator 16. The rotation of the mounted exciter rotor 14, adjacent to the electrified exciter stator 16, generates a three-phase AC current, which is delivered to three respective AC input bus bars 54 by the conductors 36 and terminal connectors 58. Each phase of the AC current is transmitted from the bus bar 54 to one diode 56. The diodes 56 are configured in a half bridge configuration and operate to provide rectification of the AC current to the DC current. The DC current from each diode 56 is transmitted through the ladder structure 48 to the DC bus bar 52, where the DC current is further transmitted by the terminal connectors 58 and conductors 36 into the main windings 38 of the main machine rotor 20. The rotation of the main machine rotor 20 about the main machine stator 22 generates the electricity that is used to power the generator load.

In the instance where the rectifier assembly 27 is configured to allow coolant to traverse the interior of the rectifier assembly 27, the coolant may operate to cool any transient or steady-state temperature conditions that develop at the ladder structure 48, the diodes 56, and/or any of the bus bars 54, 52. Alternatively, the ladder structure 48 may be configured to receive heat generated by the operation of the diodes 56, and the coolant may dissipate heat from the ladder structure 48. Alternate coolant configurations are envisioned.

Many other possible embodiments and configurations in addition to that shown in the above figures are contemplated by the present disclosure. For example, one embodiment of the invention contemplates alternate configurations of forward or reverse-biased diode that may provide for full wave or half wave rectification. Another example of the invention contemplates using a self-contained oil system for cooling, or air for cooling. In yet another embodiment of the invention, the shaft tube 30 may be made from either a conductive or non-conductive material to achieve further cost reduction. Furthermore, a different example of the invention may forgo the shaft tube 30 altogether and provide for the rectifier subassembly to be received directly into the rotatable shaft.

In yet another example embodiment, any number of AC and or DC bus bars 52, 56 may be configured having at least a resilient portion biasing each resilient bus bar 52, 54 outwardly, and a corresponding number and alignment of indexed keyways 60 on the inner surface 39 of the tube shaft 30, such that the plurality of resilient bus bars 52, 54 define a plurality of keys, which provide for the keyed axial insertion of the rectifier subassembly 32 within the tube shaft 30. Furthermore, the bus bars 52, 54 may be keyed differently from each other, such that the subassembly 32 is radially indexed to properly align in only a single configuration, and/or each keyed bus bar 52, 54 may only be properly received by single keyway 60.

Moreover, the design and placement of the various components may be rearranged such that a number of different in-line configurations could be realized.

One advantage that may be realized in the above embodiments is that the above described embodiments have superior weight and size advantages over the conventional type generator rectification systems. With the proposed rotating arrangement, current rectification can be achieved without the external space constraints of additional circuitry. Additionally, the construction and assembly of the rectifier will result in reduced maintenance downtime. Yet another advantage of the above embodiments is that the oil or coolant already present in the rotating shaft may be used to maintain the rectifier assembly, saving additional weight and size of a separate component. A further advantage of the above embodiments is that it reduces the risks of the diode electrically shorting to a metallic shaft. Moreover, due to the rotational balance of the rectifier assembly, a high peripheral speed can be achieved due to the reduced centrifugal forces of moving the assembly closer to the common axis of rotation. The higher peripheral speed results in a lower generator electromagnetic weight.

Yet another benefit of the above embodiments is that the assembling of the rectifier assembly is that the keyed configuration of the resilient bus bar with the keyway provides for an effective method for proper alignment of the subassembly with the shaft tube, as the assembling will only complete when both components are oriented correctly, relative to each other. Furthermore, the resiliency of the bus bar, as aligned with the mounting connector openings provides for easy insertion of the subassembly within the tube to the proper depth, as the terminal connector will be biased through the opening with proper alignment at the correct insertion level. Additionally, the configuration of the protrusions with the anchor fastener openings provide for and easy method of manual rotational alignment, as the alignment of the fastener openings with the protrusions will provide a proper key/keyway alignment, or knowledge that the alignment is off by 180 degrees. Additionally, the configuration of the anchor fastener openings and the protrusions also provide indication of the correct insertion levels of the subassembly within the shaft tube. The ease of assembly results in a reduction of assembly time and reduced maintenance costs.

Yet another benefit of the above embodiments is that the insulating gap prevents melting of a meltable shaft tube when exposed to heat from the rotatable shaft, such as when the PMG rotor is welded to the rotatable shaft. The prevention of the shaft tube melting increases the reliability of the generator due to limiting the possibility of generator failure due to the partial melting of the tube, or harm that may come to the rectifier subassembly due to the melting. Additionally, the prevention of the shaft tube melting prevents the need for costly generator shaft repairs due to melting damage of the shaft tube, rectifier subassembly, or the rotatable shaft.

When designing aircraft components, important factors to address are size, weight, and reliability. The above described rectifier assembly has a decreased number of parts as the system will be able to provide rectified DC outputs with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rectifier assembly for placement within a rotating shaft of an electric machine assembly having a first machine providing an alternating current output and a second machine receiving a direct current input, the rectifier assembly comprising:
   a rectifying subassembly having a bus bar electrically coupling with at least one of the direct current input of the second machine or the alternating current output of the first machine, and wherein the rectifier subassembly is configured to convert the alternating current output to the direct current input; and
   a non-conductive sleeve having an outer surface and an inner surface defining an interior having a keyway, and configured to axially receive the rectifying subassembly;
   wherein the bus bar itself is a key, which, when radially aligned with the keyway, provides for the keyed axial insertion of the rectifier subassembly within the sleeve, such that the rectifying subassembly is radially indexed within the sleeve to properly align the rectifying subassembly and the sleeve.

2. The rectifier assembly of claim 1 wherein the inner surface further comprises at least a first portion of a radial segment defined by a stop extending from the inner surface, and at least a second portion of the radial segment, different from the first, defines the keyway without the stop.

3. The rectifier assembly of claim 2 further comprising the bus bar, when partially received by the sleeve, at least partially intersects the radial segment, wherein physical interference between the bus bar and the stop prevents an improperly aligned subassembly from being fully inserted into the sleeve.

4. The rectifier assembly of claim 3 wherein the bus bar further comprises at least a resilient portion configured to bias the bus bar outwardly along the inner surface of the sleeve when the subassembly is inserted into the sleeve.

5. The rectifier assembly of claim 4 wherein the keyway further comprises an open top channel extending axially along the inner surface of the sleeve, and wherein the bus bar, which, when radially aligned with the keyway, is biased into the channel such that channel prevents the subassembly from axial rotation independent of the sleeve.

6. The rectifier assembly of claim 1 further comprising a plurality of bus bars, and an inner surface defining an interior having a corresponding plurality of keyways, wherein the bus bars themselves are keys, which provide for the keyed axial insertion of the rectifying subassembly within the sleeve, such that the rectifying subassembly is radially indexed within the sleeve to properly align the rectifying subassembly and the sleeve.

7. The rectifier assembly of claim 6 wherein the sleeve further comprises an opening radially aligned with the electrical coupling of the resilient bus bar when the subassembly is fully inserted into the sleeve.

8. The rectifier assembly of claim 1 wherein the sleeve further comprises at least one extension tab on at least one of an axial end of the sleeve, wherein the extension tab is configured to axially align the sleeve relative to the rotating shaft.

9. An electric machine assembly comprising:
   a thermally conductive rotatable shaft defining a shaft interior;
   a machine at least partially heat coupled with the rotatable shaft; and
   a rectifier assembly comprising an electrically non-conductive sleeve received within the shaft interior and defining a sleeve interior, and a rectifying subassembly received within the sleeve interior and converting alternative current to direct current;
   wherein at least an overlapping portion of the shaft interior and the sleeve are shaped to define a thermally insulating gap between the shaft and the sleeve, such that the gap prevents a melting of the portion of the sleeve when a heat is applied to the rotatable shaft.

10. The electric machine assembly of claim 9 wherein the machine further comprises a permanent magnet heat coupled the rotatable shaft and axially positioned on the rotatable shaft to be at least axially aligned with at least a portion of the gap.

11. The electric machine assembly of claim 10 wherein the permanent magnet is welded to the rotatable shaft.

12. The electric machine assembly of claim 11 wherein the gap is sized relative to the heat generated by the weld.

13. The electric machine assembly of claim 9 wherein a diameter of the portion of the sleeve is sized relative to a corresponding diameter of the portion of rotatable shaft.

14. The electric machine assembly of claim 9 wherein the gap is further defined by a recess in of at least one of the rotatable shaft or the sleeve.

* * * * *